United States Patent [19]

Korkowski et al.

[11] Patent Number: 5,363,465
[45] Date of Patent: Nov. 8, 1994

[54] FIBER OPTIC CONNECTOR MODULE

[75] Inventors: Jeff L. Korkowski, Bloomington; David J. Emmons, Plymouth; Dalen J. Defoe, Eden Prairie, all of Minn.

[73] Assignee: ADC Telecommunications, Inc., Minneapolis, Minn.

[21] Appl. No.: 19,615

[22] Filed: Feb. 19, 1993

[51] Int. Cl.⁵ .............................................. G02B 6/36
[52] U.S. Cl. ...................................... 385/135; 385/53
[58] Field of Search ................. 385/53, 134, 135, 139, 385/147

[56] References Cited

U.S. PATENT DOCUMENTS

| | | | |
|---|---|---|---|
| 4,861,134 | 8/1989 | Alameel et al. | 385/135 |
| 4,995,688 | 2/1991 | Anton et al. | 385/53 |
| 5,090,792 | 2/1992 | Koht et al. | 385/135 X |
| 5,100,221 | 3/1992 | Carney et al. | 385/135 |

FOREIGN PATENT DOCUMENTS

| | | | |
|---|---|---|---|
| 0479227 | 4/1992 | European Pat. Off. | 385/135 |
| 2531236 | 2/1984 | France | 385/135 |

Primary Examiner—John D. Lee
Attorney, Agent, or Firm—Merchant, Gould, Smith, Edell, Welter & Schmidt

[57] ABSTRACT

A fiber optic module which includes a framework receiving circuit card cartridges. The cartridges have a plate which extends along the sides of the housing with the first edge extending a differing length than the second edge. The module includes a housing having a framework with spaces for receiving the cartridges. The framework has slots formed therein for receiving the edges of the cartridges. The slots and spaces align the cartridges in the housing so that the cartridges are properly aligned in the housing.

10 Claims, 5 Drawing Sheets

FIBER OPTIC CONNECTOR MODULE

BACKGROUND OF THE INVENTION

1. Field of the Invention

The present invention pertains to a fiber optic connector module and in particular, to a module which accepts asymmetrical telecommunications cartridges.

2. Description of the Prior Art

Modules which accept electrical cartridges are well known in the telecommunications industry. The modules insert into a framework and make connections between cables and fibers of various pieces of telecommunications equipment.

As the complexity of the connections and the use of fiber optics increases in the telecommunications industry, wire management becomes increasingly difficult. In particular, the fiber optic cables must be routed so that the radius of curvature does not cause the cables to break or crack. In addition, the connections must be made correctly, as the high number of connections made may easily lead to errors in connecting cables and wires and malfunction of equipment. To combat this problem, connections are often made using cartridges to insert into modules, which are then attached to the framework. This aligns groups of connections and ensures proper alignment when the cartridges are correctly inserted. Even with cartridges, problems may still exist as the cartridges may be improperly inserted and incorrect connections may be made.

To ensure that cartridges are inserted into the correct slot, cartridges may be made so that they have shapes which are different from one another. Similarly, the slots in the module have shapes which have corresponding shapes. However, such a design increases the number of parts which must be stocked and leads to increased costs. This design also increase the time and complexity for insertion of the various cartridges and modules as each cartridge aligns and inserts differently.

It can be seen then, that a fiber optic module is needed which accepts cartridges which are easily insertable and which are insertable in a manner that ensures correct alignment and attachments are made. It can be appreciated that a single module which may be configured so that the direction of insertion is readily apparent and which is insertable at any slot location would decrease costs while maintaining reliability.

SUMMARY OF THE INVENTION

The present invention is directed to a fiber optic connector module and cartridges inserting into the module. The module includes a housing with a frame supporting the cartridges in the housing. The cartridges include electrical connectors for attachment to telecommunication wires and cables.

The cartridges have tab members extending from the housing which align with slots in the supporting frame. The supporting frame has orifices configured for receiving the cartridges and the tab members. The pair of tab members of each cartridge have a first length and a second length corresponding to first and second slots in the frame having a first width and a second width. The different widths of the slots ensure that the cartridge is inserted in the correct orientation into the module.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals indicate corresponding elements throughout the several views.

DETAILED DESCRIPTION OF THE PREFERRED EMBODIMENT(S)

Figure 1:
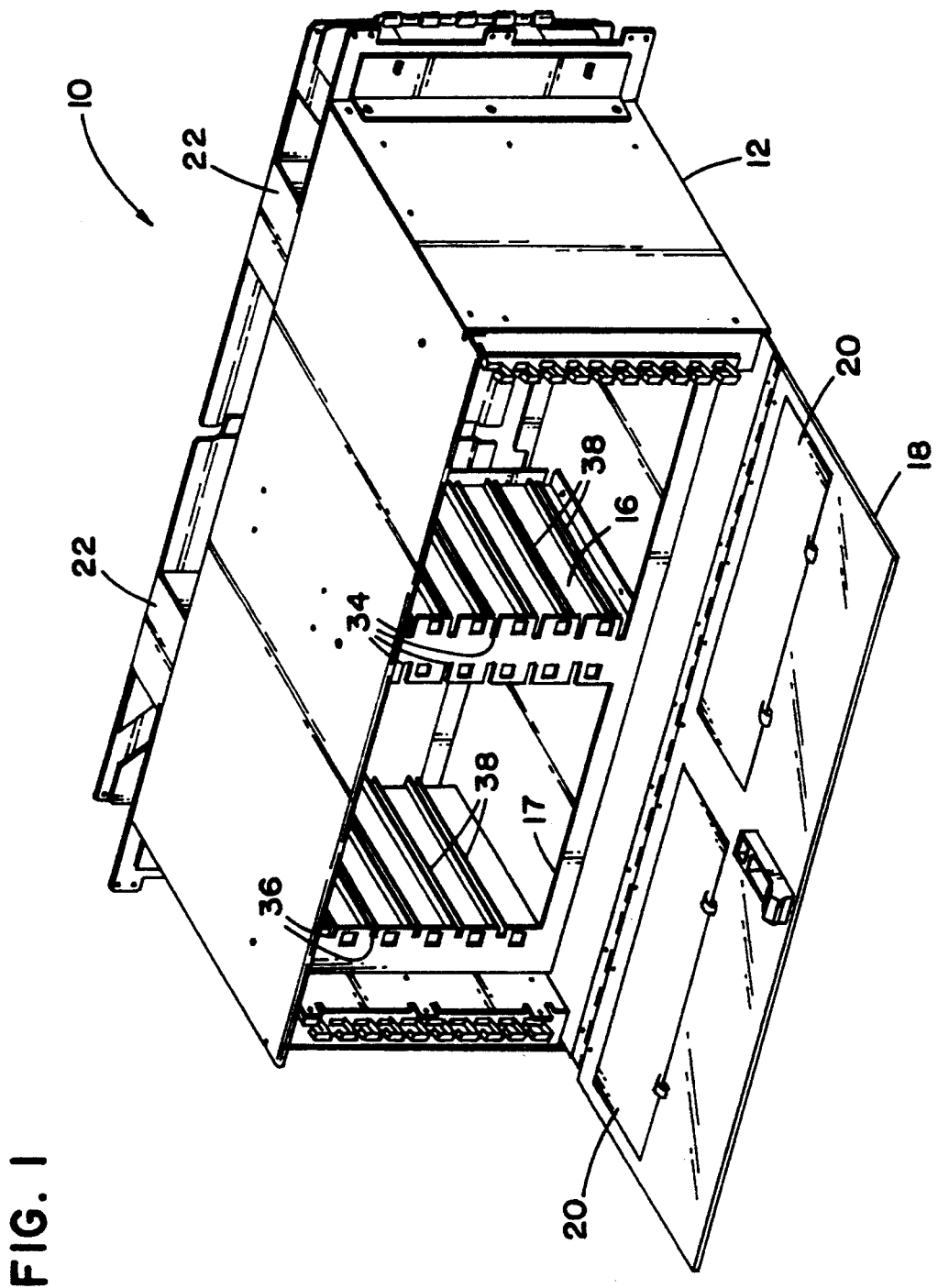
FIG. 1 shows a perspective view of a fiber optic connector module chassis according to the principles of the present invention.

Referring now to the drawings, and in particular to FIG. 1, there is shown a fiber optic telecommunications connector module, generally designated 10. The module 10 includes a cabinet type housing 12 which receives cartridges 14 carrying circuit cards, shown in FIG. 2. The cartridges 14 are held in a supporting frame 16 and inserted into the housing 12 through a forward door 18. As shown in FIG. 1, the door 18 swings down for access to the housing 12. The door 18 includes designation cards 20 containing information on wiring and circuit cards.

In a preferred embodiment, the module 10 may include cable distribution members 22 mounted at the rear of the housing 12. The cable distribution members 22 aid in guiding wires and cables to other modules and telecommunications equipment. In the preferred embodiment, the frame 16 includes two orifices having a column 30 and 32 of spaces 24 with each column receiving six cartridges 14 in six associated spaces 24. The supporting frame 16 includes slots 34 and 36 in a forward wall 17 of the supporting frame and guiding rails 38 extending rearwardly from the forward wall 17.

Figure 3:
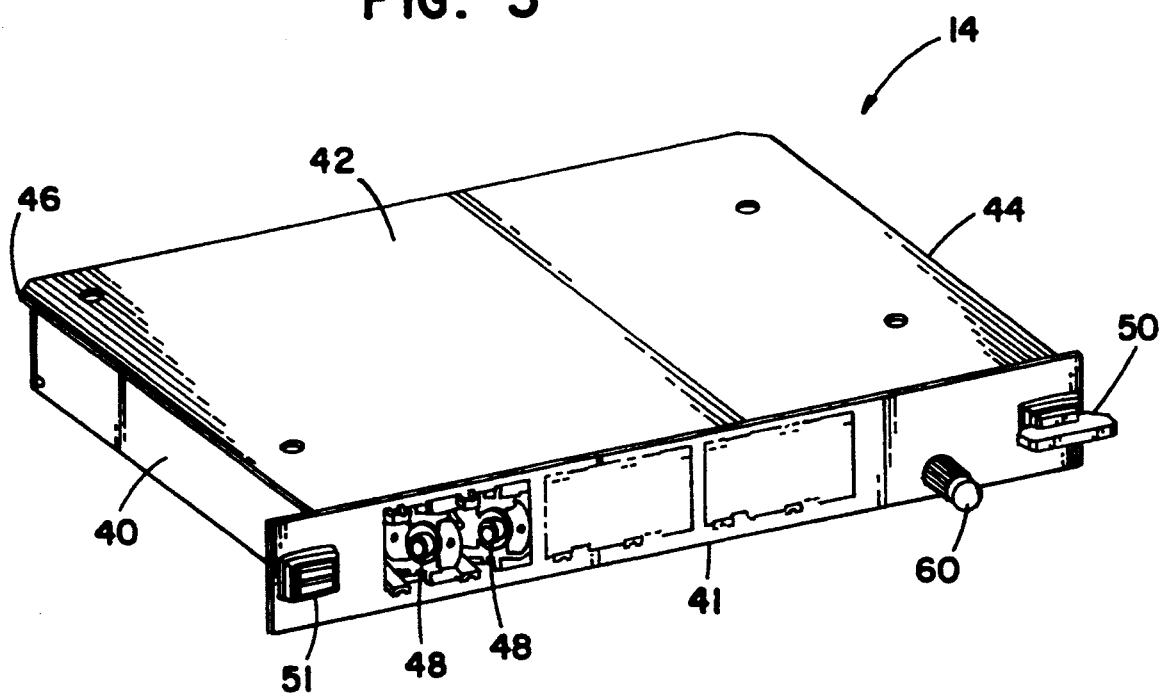
FIG. 3 shows a front perspective view of a connector module cartridge.

As shown in FIG. 3, each cartridge 14 includes a cartridge housing 40 and an attached plate 42. The housing 40 contains circuit cards which are in electrical communication with connectors at the front and/or rear of the cartridge, as explained hereinafter. The plate 42 is affixed to one face of the cartridge housing 40 and extends over two opposing sides of the housing. The plate 42 has a first edge 44 which extends over one side of the housing 40 and a second edge 46 which extends over the opposite side. In the preferred embodiment, the first edge 44 has a greater length than the second edge 46. However, the second edge may have a greater length than the first edge 44. The edges 44 and 46 function as alignment tab members, as explained hereinafter.

In the preferred embodiment, the cartridges 14 include a number of fiber optic cable connectors 48 mountable in a forward plate 41 of the cartridges 14. The connectors 48 are angled in the preferred embodiment to aid in guiding fiber optic cables (not shown) through the module 10 so that the bending radius of the cables is not too sharp so as to cause damage to the cable. The connectors 48 snap into an opening in the forward plate and may be inserted so that the angled portion is directed to either side of the cartridge 14.

Figure 6:
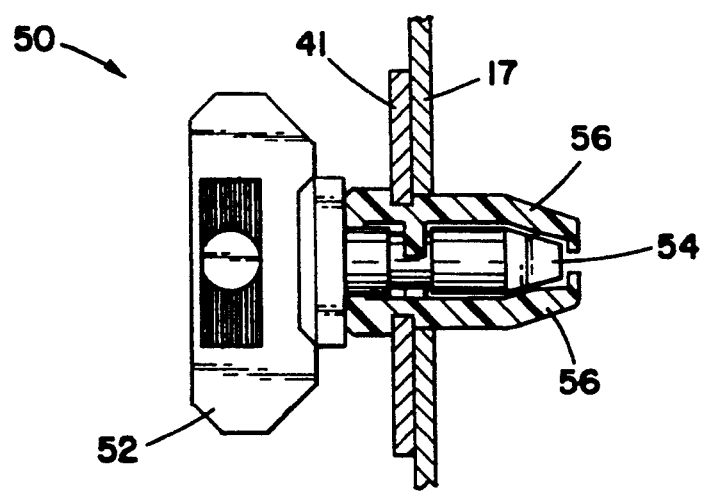
FIG. 6 shows a side elevational view of a cartridge locking member in an unlocked position; and, FIG. 7 shows a side elevational view of a cartridge locking member in a locked position.
Figure 7:
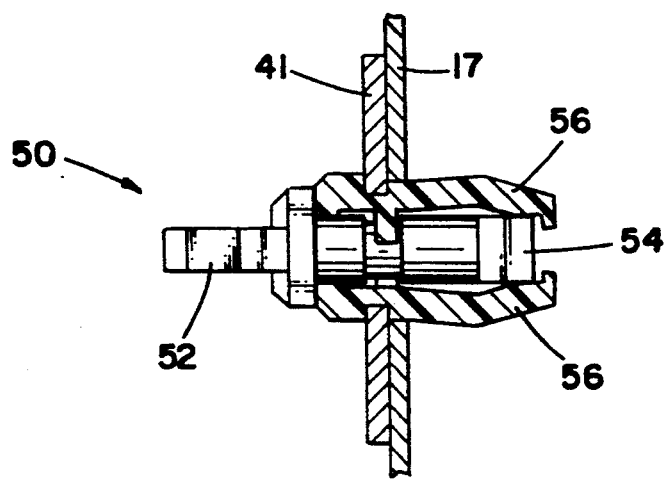

The cartridges 14 also include a pair of locking members 50 mounted at the forward plate 41. Each locking member 50 engages an associated lock orifice 26 in the forward wall 17. The lock orifices 26 are aligned on both sides of each column 30 and 32 on either side of the associated cartridge spaces 24. As shown in FIGS. 6 and 7, locking members 50 include a handle 52 which attaches to a central pin 54 having a flattened end portion which has a greater height than width. A central pin 54 engages an opposed pair of flanges 56. The flanges 56 are normally spaced so as to fit through an associated lock orifice 26 in the front wall 17. As shown in FIG. 6, when the rotatable handle of the locking member is in a first position, the pin portion 54 does not spread the flanges 56 apart. In this manner, the plate 41 can be pushed against the supporting frame 16 as the locking member flanges 56 fit through the orifices 26.

Upon rotation of the handle to the position shown in FIG. 7, the central pin 54 is rotated so that the flattened end section has its widened portion between the flanges 56. This spreads the flanges 56 outward so that the cartridge 14 is retained. In this position, the distance between the spread flanges 56 is sufficiently wide so that the locking members 50 will not fit through the orifices 26. In this manner, the cartridge 14 is secured in the supporting frame 16.

Referring again to FIG. 3, in one embodiment, the cartridge 14 will include only one complete locking member 50. The second locking member 51 includes only the spreadable flanges 56 and does not include a central pin. With this arrangement, the flanges 56 still aid to align the cartridge 14 and the flanges 56 insert into the associated lock orifice 26. The second locking member 50 still has sufficient retaining capabilities to prevent the cartridge 14 from being accidentally moved from its inserted position.

Figure 4:
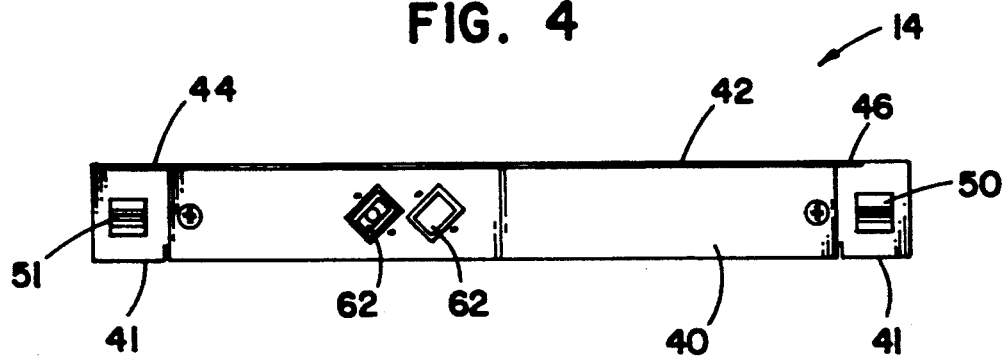
FIG. 4 shows a rear elevational view of the cartridge shown in FIG. 3.

The cartridge 14 may include multiplexing capabilities on the circuit card for connecting various components of telecommunications equipment. In addition to the fiber optic cable connectors 48, the cartridge 14 may also include other telecommunications connectors 60 for attachment to various telecommunications connectors. The connections from the rear of the cartridge 14 are made with connectors 62 which may be adapted for various types of requirements, as shown in FIG. 4.

With the configuration of the frame 16 and cartridges 14, the cartridges 14 are inserted into the module 10 and are automatically aligned. The slots 34 and 36 in the frame 16 have a width which roughly corresponds to the length of the edges 44 and 46 of the cartridge plate 42. The differing lengths of the slots 34 and 36 and the corresponding plate edges 44 and 46 ensure that alignment is properly made when the cartridge 14 inserts into the supporting frame 16. Each of the slots 34, 36 has an associated guiding rail 38 which supports a corresponding edge 44 or 46.

Figure 2:
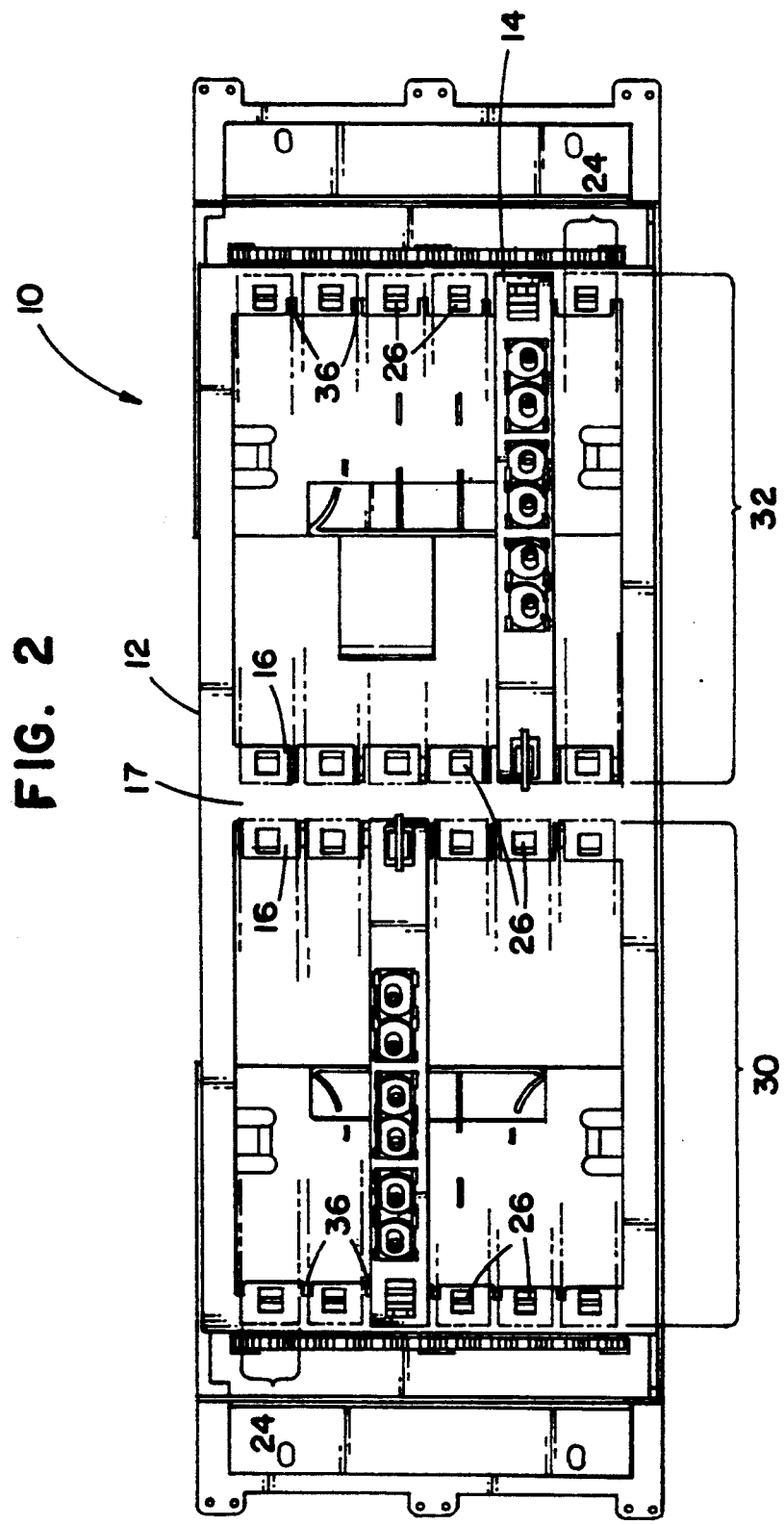
FIG. 2 shows a front elevational view of the fiber optic connector module shown in FIG. 1 with the door removed and having cartridges inserted.

As shown in FIG. 2, the supporting frame 16 has a row of the slots 34 on opposite sides of the columns 30 and 32. The second slots 36 are on opposite sides of the columns 30 and 32, reversed from the arrangement for the slots 34. Each column 30 or 32 has the slots 34 on one side and the slots 36 on the second side. In this manner, the edges 44 and 46 align in the slots in the first column 30 in a first orientation and align in reverse orientation in the second column 32. The cartridges 14 insert so that the plate 42 is above the housing 40 when inserted in first column 30 and below the housing 40 of the cartridge 14 when inserted in the second column 32. In this manner, the cartridges can be flipped upside down and be inserted from one column into another. The asymmetrical edge members ensure proper orientation of the cartridges 14 into the supporting frame 16. It also provides for use of a single cartridge part which can be adapted to either column 30 or 32 and which can be easily identified for proper position within the columns 30 and 32. Furthermore, the fiber optic connectors 48 angle in a direction toward the edge of the module 10 so that correct insertion direction is easier to identify.

The slots 34 and 36 are positioned relative to the locking orifices 26 so that the slots 34 and 36 are above the locking orifices in first column 30 and below the locking orifices the second column 32. This provides for universal manufacturing of the locking members so that the cartridges 14 can be inserted in either column for engagement of the locking members 50.

Figure 5:
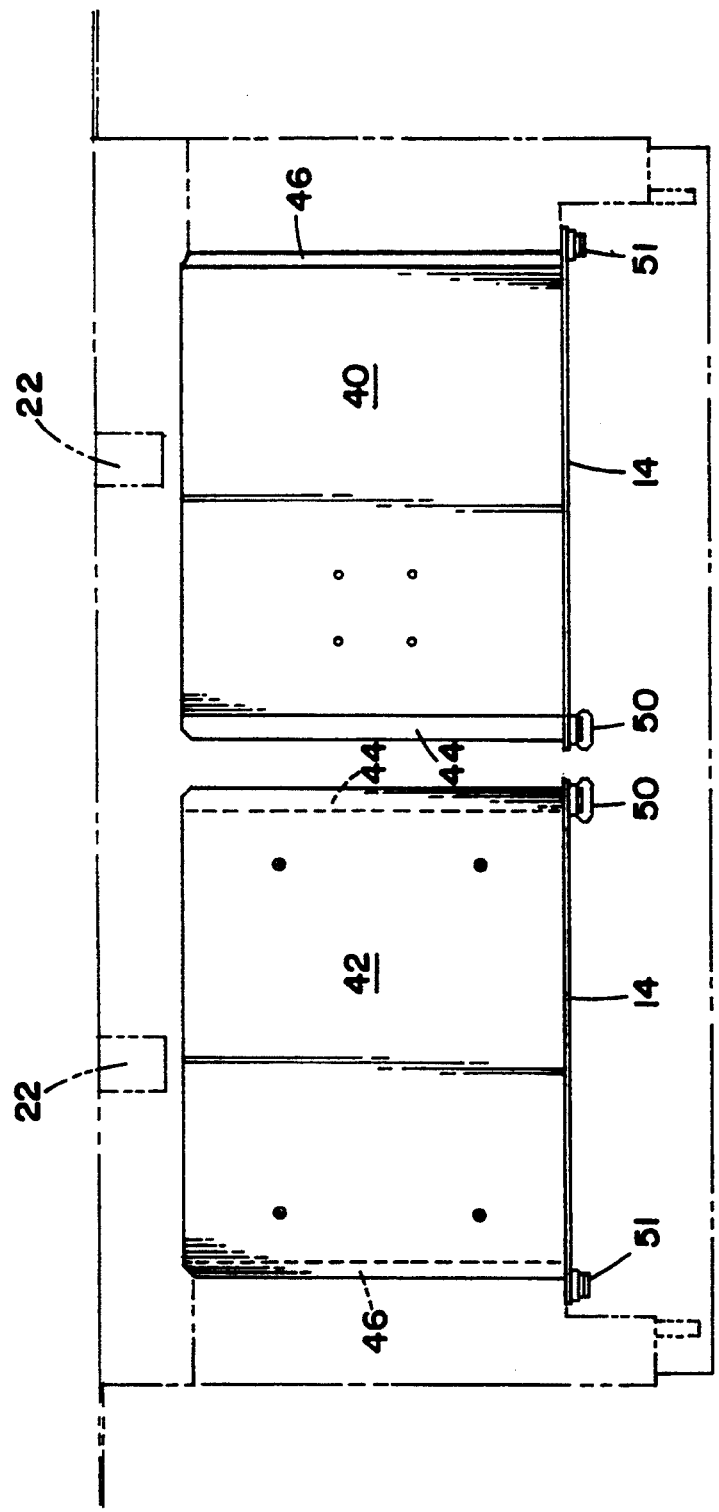
FIG. 5 shows a top view of two cartridges inserted into the chassis.

As shown in FIG. 5, when inserted in column 30, the plate 42 is at the top of the cartridge 14. When inserted in the second column 32, it can be seen that the cartridge 14 is inverted and the plate 42 is below the housing 40 of the cartridge 14. It can also be appreciated that when inserted, the locking member 50 and partial locking member 51 are on reversed sides of the cartridge 14 compared to the inserted position in the other column.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A telecommunications module, comprising:
   a housing including an opening at a forward wall of the housing;
   a plurality of removable cartridges containing telecommunications equipment and insertable into the housing, wherein the cartridges slide into the housing through the opening, wherein each cartridge has a first and a second side, said first side having a first cartridge guide of a first predetermined shape and said second side having a second cartridge guide of a second predetermined shape;
   a cartridge supporting frame including a plurality of spaces for receiving the plurality of cartridges, said frame including first and second columns of said spaces, each of said first and second columns including first and second frame guides on opposite sides of said spaces, said first frame guide having a size and disposition so as to slidably mate with said first cartridge guide and said second frame guide having a size and disposition so as to slidably mate with said second cartridge guide;

said first and second frame guides disposed on first and second sides, respectively, of said spaces of said first column;

said first and second frame guides disposed on second and first sides, respectively, of said spaces of said second column whereby said cartridges are insertable into said spaces of said first column in a first orientation and insertable into said spaces of said second column in a second orientation inverted from said first orientation.

2. A telecommunications module according to claim 1, further comprising cartridge-locking members for locking the cartridges in the frame.

3. A telecommunications module according to claim 2, wherein the locking members comprise rotatable locking members, wherein the locking members lock the cartridge in a lock the cartridge in a first position and wherein rotating the locking members unlocks the cartridge.

4. A telecommunications module according to claim 1, wherein said cartridge guides are a plurality of tab members and wherein said frame guides are a plurality of slots receiving the tab members.

5. A telecommunications module according to claim 4, wherein said plurality of tab members includes first tab members having a first length and a second tab member having a second length, and wherein said plurality of slots includes slots have corresponding widths.

6. A telecommunications module according to claim 4, wherein the slots include guiding rails extending rearwardly receiving the tab members.

7. A telecommunications cartridge for inserting into a fiber optic module having a cabinet with an interior accessible through an opening and including a frame defining a first column of spaces and a second column of spaces, a first plurality of frame guides disposed on a first side of said spaces of said first column and on a second side of said spaces of said second column, a second plurality of frame guides disposed on a second side of said spaces of said first column and on a first side of said spaces of said second column, said cartridge comprising:

a housing having a predetermined size so as to be received within any one of said spaces;

one or more telecommunications connectors mounted on said housing;

a first cartridge guide disposed on a first side of said cartridge, said first cartridge guide having a size and disposition so as to slidably mate with any one of said frame guides of said first plurality of frame guides; and a second cartridge guide disposed on a second side of said cartridge, said second cartridge guide having a size and disposition so as to slidably mate with any one of said frame guides of said second plurality of frame guides whereby said cartridge is slidable into any one of said spaces of said first column in a first orientation and slidable into any one of said spaces of said second column in a second orientation.

8. A cartridge according to claim 7, comprising locking members mounted on a forward end on either of said first and second sides of the housing.

9. A cartridge according to claim 8, wherein the locking members comprise spreading retaining members.

10. A cartridge according to claim 7, wherein the connectors comprise angled fiber optic connectors.

* * * * *

UNITED STATES PATENT AND TRADEMARK OFFICE
CERTIFICATE OF CORRECTION

PATENT NO.  :   5,363,465

DATED       :   November 8, 1994

INVENTOR(S) :   Korkowski et al.

It is certified that error appears in the above-identified patent and that said Letters Patent is hereby corrected as shown below:

Column 5, claim 3, line 17, delete "lock the cartridge in a" after the letter "a" (first occurence).

Signed and Sealed this

Twenty-first Day of March, 1995

Attest:

BRUCE LEHMAN

Attesting Officer        Commissioner of Patents and Trademarks